United States Patent
Matsunaga et al.

(10) Patent No.: US 12,486,793 B2
(45) Date of Patent: Dec. 2, 2025

(54) ENGINE DEVICE

(71) Applicant: Yanmar Holdings Co., Ltd., Osaka (JP)

(72) Inventors: Daichi Matsunaga, Osaka (JP); Kazuteru Toshinaga, Osaka (JP); Yusuke Honda, Osaka (JP); Kenji Hiraoka, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/920,523

(22) Filed: Oct. 18, 2024

(65) Prior Publication Data

US 2025/0129732 A1    Apr. 24, 2025

(30) Foreign Application Priority Data

Oct. 20, 2023  (JP) .................. 2023-181192
Oct. 20, 2023  (JP) .................. 2023-181193

(51) Int. Cl.
    *F01N 3/20*    (2006.01)
(52) U.S. Cl.
    CPC ............ *F01N 3/20* (2013.01); *F01N 3/2053* (2013.01)
(58) Field of Classification Search
    CPC .. F01N 3/2053; F01N 3/2066; F01N 2550/02; F01N 13/0093; F01N 2550/10; F01N 3/0878; F01N 2410/00; F01N 3/2892; F01N 2550/06; F01N 2240/36; F01N 3/021; F01N 3/101; F01N 3/0885; F01N 11/00; F01N 11/002
    See application file for complete search history.

(56) References Cited

FOREIGN PATENT DOCUMENTS

| CH | 706295 A2 | 9/2013 |
| CN | 111663981 A | 9/2020 |
| JP | 2001009281 A | * 1/2001 |
| JP | 4383983 B2 | 12/2009 |
| JP | 6743499 B2 | 8/2020 |

OTHER PUBLICATIONS

English Translation of JP 2001-009281 (Year: 2001).*
The Extended Search Report dated Jan. 29, 2025 issued in EP Patent Application 24205747.9.

* cited by examiner

*Primary Examiner* — Anthony Ayala Delgado
(74) *Attorney, Agent, or Firm* — NORTON ROSE FULBRIGHT US LLP

(57) ABSTRACT

This engine device runs on a fuel containing a toxic substance. The engine device includes: an exhaust passage that causes an exhaust substance that is discharged from an engine, such as an exhaust gas or a blow-by gas, to flow through; a plurality of treatment devices having different functions that are disposed in the exhaust passage as devices that perform a treatment of the exhaust substance; and a path switching valve that is disposed in the exhaust passage, and switches, from among the plurality of treatment devices, to the treatment device that performs the treatment of the exhaust substance. The toxic substance contained in the fuel is ammonia or methanol. The engine device includes an external drive pump that causes a blow-by gas to flow through a blow-by path, and also includes, as the plurality of treatment devices, an exhaust purification catalyst device, an abatement device, and an intake return device.

19 Claims, 3 Drawing Sheets

| | INTAKE RETURN DEVICE | EXHAUST PURIFICATION CATALYST DEVICE | ABATEMENT DEVICE |
|---|---|---|---|
| DURING ENGINE OPERATION | ○ | ● | ○ |
| AFTER ENGINE STOPPED | × | ● | ○ |
| AT ENGINE EMERGENCY STOP | × | ○ | ● |

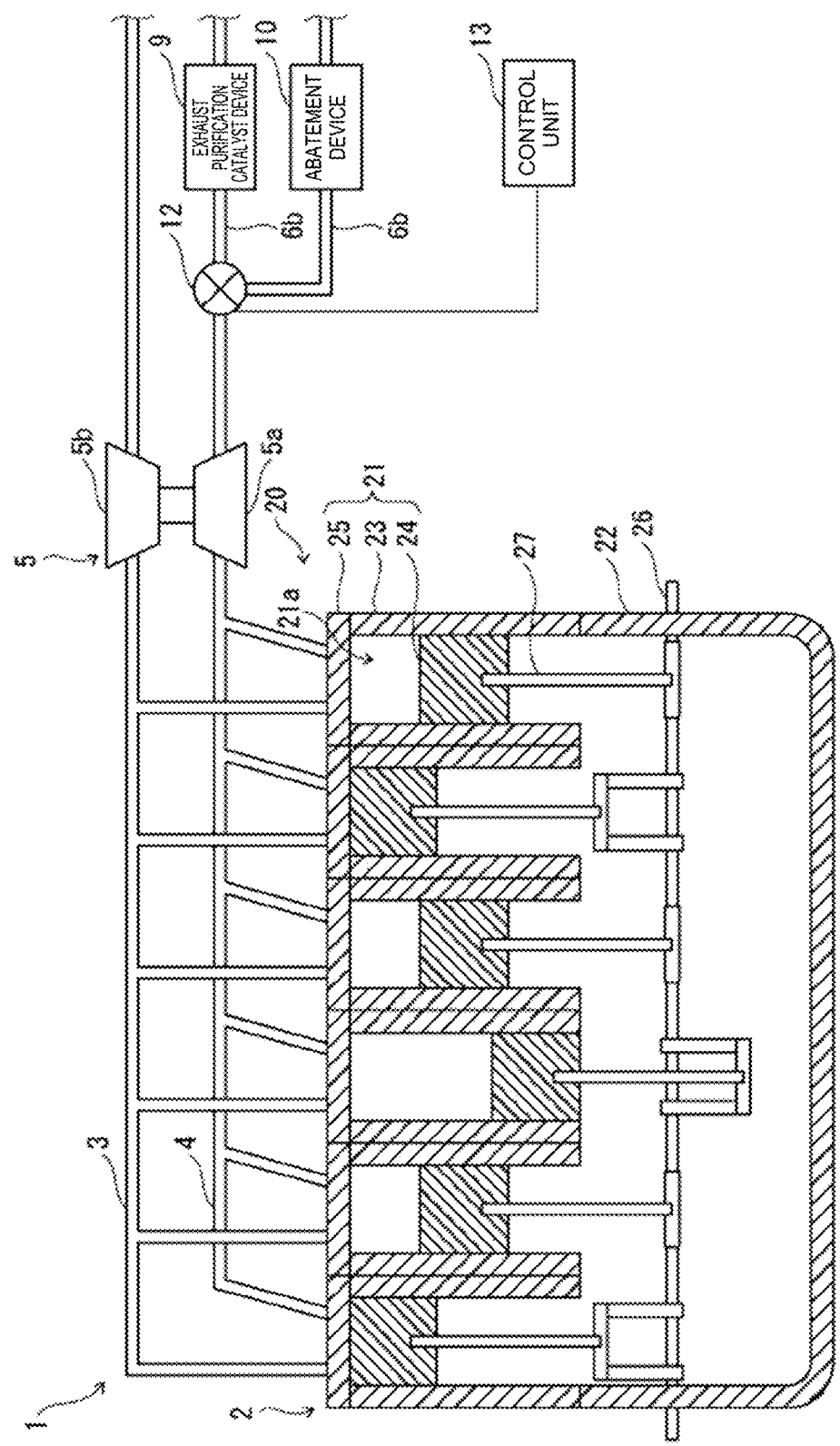

ENGINE DEVICE

CROSS-REFERENCE TO RELATED APPLICATION

This application claims priority under 35 U.S.C. § 119 to Japanese Patent Application Nos. 2023-181193, filed on Oct. 20, 2023 and 2023-181192, filed on Oct. 20, 2023, the entire contents of which are hereby incorporated by reference in their entireties.

TECHNICAL FIELD

The present invention relates to an engine device that runs on a fuel that contains a toxic substance.

BACKGROUND ART

Conventionally, some engine devices run on a fuel that contains a toxic substance such as ammonia and methanol, that is, a fuel that contains "a harmful substance that should be labeled" under the Japanese Industrial Safety and Health Act. Furthermore, some engine devices are provided with an exhaust purification catalyst device that purifies an exhaust gas by catalytic reduction. Specifically, an exhaust purification catalyst device purifies an exhaust gas by injecting a reducing agent containing a toxic substance into the exhaust gas, and reducing the toxic substance contained in the exhaust gas into a harmless substance. Meanwhile, the toxic substance in the reducing agent that has not been used in the reduction (for example, ammonia in ammonia slip) is purified by being adsorbed and decomposed by a catalyst. In addition, in an engine device, a fuel gas supplied to a combustion chamber may leak out into the crank chamber (crankcase) as a blow-by gas. Therefore, an engine device is required to treat such a blow-by gas.

For example, in Patent Document 1, in an exhaust gas purification system of an internal combustion engine, which includes a selective reduction-type catalysis device in an exhaust passage of the internal combustion engine, part of the exhaust passage further on a downstream side than the selective reduction-type catalysis device branches into two branch passages, an ammonia adsorption removal device is provided in each of the two branch passages, and a flow path switching device that switches the flow of the exhaust gas between the two branch passages is provided at the branch point of the two branch passages. A control device that controls the exhaust gas purification system controls the flow path switching device, and flows the exhaust gas through a branch passage provided with one of the ammonia adsorption removal devices among the ammonia adsorption removal devices provided in each of the two branch passages. Furthermore, when a detected value of an ammonia concentration detection device becomes greater than or equal to a first set concentration threshold that has been set in advance, the control device controls the flow path switching device, and performs a control that switches the flow of the exhaust gas from the branch passage provided with one ammonia adsorption removal device to the branch passage provided with the other ammonia adsorption removal device. In a conventional technique such as that of Patent Document 1, an exhaust purification catalyst device is configured by a selective reduction-type catalysis device and two ammonia adsorption removal devices. In addition, for example, Patent Document 2 discloses a blow-by gas recirculation device that is used in an internal combustion engine in which a turbocharger and an intercooler that cools an intake gas that has been pressurized by the turbocharger are provided in an intake passage, where the blow-by gas recirculation device is equipped with an air introduction passage that introduces the intake gas inside the intake passage into a crankcase of the internal combustion engine, and a gas recirculation passage that recirculates a blow-by gas inside the crankcase of the internal combustion engine into the intake passage. The gas recirculation passage communicates with the intake passage on an intake upstream side of the turbocharger. As a result, the blow-by gas inside the crankcase is recirculated to the intake passage, and is reintroduced into the combustion chamber. Moreover, the air introduction passage communicates with the intake passage on an intake upstream side of the intercooler, which is on an intake downstream side of the turbocharger. As a result, a portion of the air that has been compressed by the turbocharger is supplied into the crankcase, which ventilates the inside of the crankcase.

PRIOR ART DOCUMENT

Patent Document

Patent Document 1: Japanese Patent No. 6743499
Patent Document 2: Japanese Patent No. 4383983

SUMMARY OF INVENTION

Technical Problem

In the case of an engine device that runs on a fuel that does not contain a toxic substance, that is, "a harmful substance that should be labeled" under the Japanese Industrial Safety and Health Act, an exhaust purification catalyst device using a reducing agent that contains a toxic substance is capable of adsorbing the toxic substance in the slipped reducing agent that has not been used in the reduction. Further, if an abnormality occurs in the exhaust purification catalyst device, discharge of the toxic substance to the outside can be suppressed by stopping the injection of the reducing agent. However, in the case of an engine device that runs on a fuel containing a toxic substance, the toxic substance is contained in an exhaust substance, such as an exhaust gas or a blow-by gas, that is discharged from the engine. Therefore, in the conventional technique, if an abnormality occurs in the exhaust purification catalyst device, the toxic substance contained in the exhaust substance from the engine is discharged to the outside even when the injection of the reducing agent is stopped, which may cause human harm. Furthermore, in an engine device, if a fuel containing a toxic or harmful substance such as ammonia or methanol, that is, "a harmful substance that should be labeled" under the Japanese Industrial Safety and Health Act, leaks from a location other than the intake and exhaust pipes, the fuel pipes, and the like, which are locations in which the fuel inevitably exists, such as when a leak occurs from the crankcase as a blow-by gas, there is a possibility that human harm may occur. In a conventional technique such as that of Patent Document 2, when a blow-by gas is treated by a single means, namely by recirculation from the gas recirculation passage to the intake passage, and an abnormality occurs in the single means, the blow-by gas treatment function may become impaired, causing the toxic or harmful substance to leak to the outside, resulting in a reduction in safety.

In addition, if an exhaust gas remains in the exhaust passage or a blow-by gas remains in the crankcase when the engine is stopped, in the conventional technique, it is not possible to ventilate the exhaust substance, such as the remaining exhaust gas or blow-by gas, because the exhaust purification catalyst device does not operate. Therefore, the toxic substance contained in the exhaust substance may be discharged to the outside. Alternatively, if a blow-by gas in the crankcase is ventilated using air from the turbocharger, which runs during operation of the engine (internal combustion engine), when the operation of the engine is stopped, the operation of the turbocharger stops, and the blow-by gas remaining in the crankcase cannot be ventilated. Therefore, the toxic or harmful substance may leak to the outside.

In this way, in the conventional technique, when an exhaust substance such as an exhaust gas or a blow-by gas is treated by a single means, namely a selective reduction-type catalysis device, and an abnormality occurs in the single means, the treatment function of the toxic substance contained in the exhaust substance may become impaired, causing the toxic substance to leak to the outside, resulting in a reduction in safety. In addition, in a case where only a means that recirculates (returns) a corrosive fuel such as ammonia into the intake passage is applied as the treatment of the blow-by gas, there is a concern that contamination of the intake system components may proceed more quickly, resulting in shorter replacement intervals for the intake system components. In contrast, when corrosion-resistant components or corrosion-resistant coatings are used for the intake system components, the cost may increase, resulting in a reduction in product appeal.

An object of the present invention is to provide an engine device that, without relying on a single means of performing treatment of an exhaust substance or a blow-by gas containing a toxic substance, is capable of improving safety by suppressing leakage of the exhaust substance and the blow-by gas.

Solution to Problem

In order to solve the above problem, an engine device according to the present invention is an engine device that runs on a fuel containing a toxic substance, and includes: an exhaust passage that causes an exhaust substance that is discharged from an engine to flow through; a plurality of treatment devices having different functions that are disposed in the exhaust passage as devices that perform a treatment of the exhaust substance; and a path switching valve that is disposed in the exhaust passage, and switches, from among the plurality of treatment devices, to the treatment device that performs the treatment of the exhaust substance. Furthermore, in order to solve the above problem, the engine device according to the present invention is an engine device that runs on a fuel containing a toxic substance, and includes: a plurality of treatment devices having different functions as devices that perform a treatment of a blow-by gas; and a path switching valve that switches, from among the plurality of treatment devices, to the treatment device that performs the treatment of the blow-by gas.

Advantageous Effects of Invention

According to the present invention, provided is an engine device that, without relying on a single means of performing treatment of an exhaust substance or a blow-by gas containing a toxic substance, is capable of improving safety by suppressing leakage of the exhaust substance and the blow-by gas.

BRIEF DESCRIPTION OF DRAWINGS

FIG. 4 is a schematic diagram illustrating an example of an engine device according to a first modification of the present invention.

DESCRIPTION OF EMBODIMENTS

Figure 1:
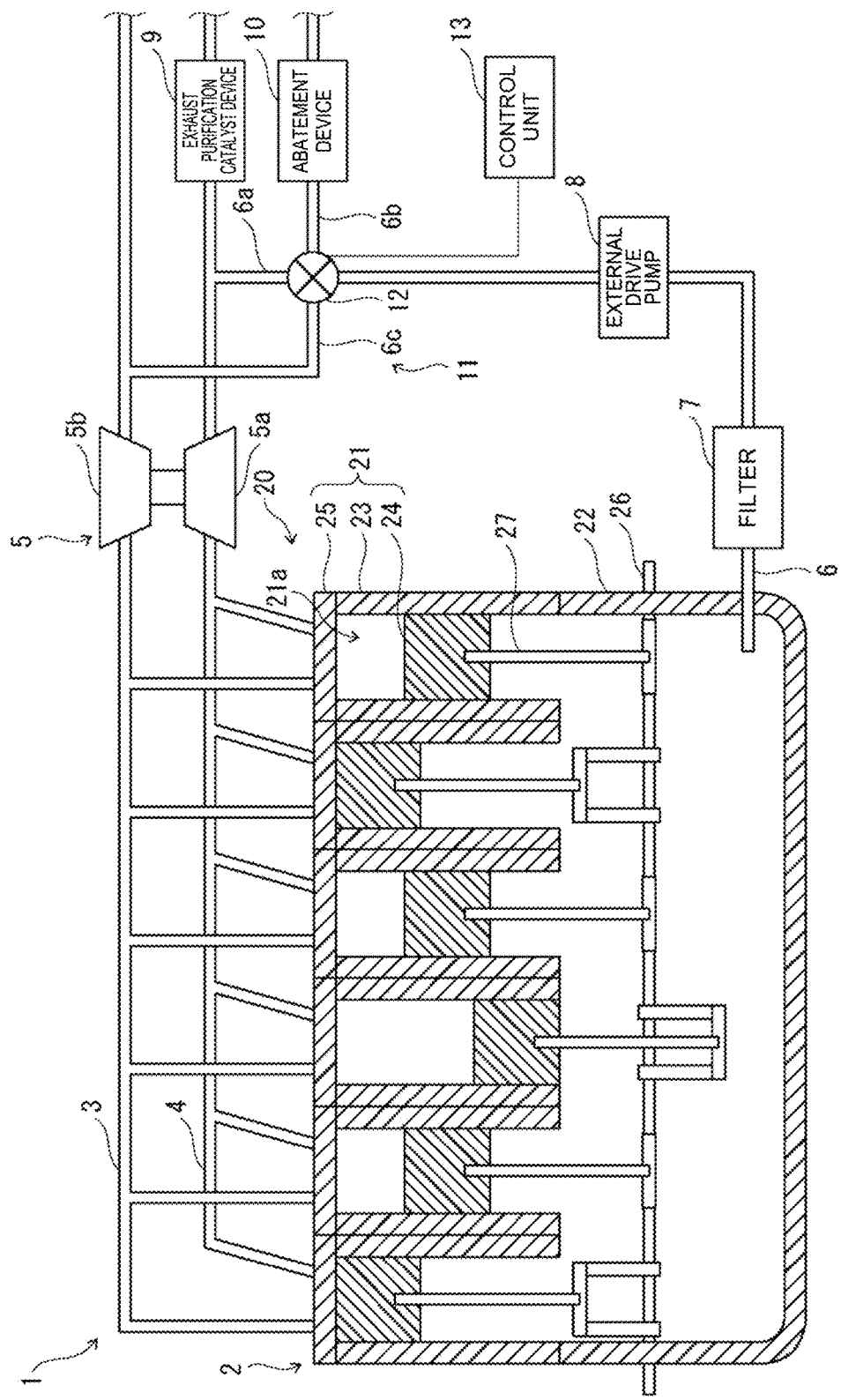
FIG. 1 is a schematic diagram illustrating an example of an engine device according to an embodiment of the present invention.

An engine device 1, which is an embodiment of the present invention, will be described with reference to drawings. As shown in FIG. 1, the engine device 1 includes an engine 2, an intake passage 3, an exhaust passage 4, and a turbocharger 5. In addition, the engine device 1 includes a blow-by path 6, a filter 7, an external drive pump 8, an exhaust purification catalyst device 9, an abatement device 10, an intake return device 11, a path switching valve 12, and a control unit 13.

Specifically, in the present embodiment, the engine device 1 is an engine that runs by introducing a fuel that contains a toxic substance such as ammonia or methanol, that is, a fuel that contains "a harmful substance that should be labeled" under the Japanese Industrial Safety and Health Act, into combustion chambers 21a of the engine 2. The fuel is supplied to the combustion chambers 21a as a mixed gas with air.

The engine 2 is, for example, a four-stroke engine, and is configured with a cylinder block 20 having a plurality of engine cylinders 21, and a crankcase 22. In FIG. 1, six engine cylinders 21 are illustrated. However, the number of engine cylinders 21 is not limited to six. As illustrated in FIG. 1, the engine cylinder 21 includes a cylinder 23, a piston 24, and a cylinder head 25.

The cylinder 23 is formed, for example, having a cylindrical shape inside the cylinder block 20. The piston 24 is accommodated so as to be capable of sliding inside the cylinder 23. The cylinder head 25 is attached to the upper side of the cylinder 23. The combustion chamber 21a is formed on the inner side of the cylinder 23 and the cylinder head 25. The cylinder head 25 is provided with an ignition device (not shown) that ignites the fuel inside the combustion chamber 21a.

Each cylinder 23 of the plurality of engine cylinders 21 communicates with the crankcase 22. A crankshaft 26 is rotatably supported by the crankcase 22. The piston 24 of each engine cylinder 21 communicates with the crankshaft 26 via a connecting rod 27. The reciprocating motion of the piston 24 is converted into a rotary motion of the crankshaft 26 via the connecting rod 27.

The cylinder head 25 is connected to the intake passage 3 via an intake port (not shown) and the like, and introduces a mixed gas supplied from intake passage 3 into the combustion chambers 21a. In addition, the cylinder head 25 is connected to the exhaust passage 4 via an exhaust port (not shown) and the like, and discharges an exhaust gas generated in the combustion chambers 21a to the exhaust passage 4.

Note that, in FIG. 1, an example is illustrated in which the intake passage 3 and the plurality of engine cylinders 21 are directly connected. However, in order to connect the intake passage 3 and the plurality of engine cylinders 21, an intake manifold having branched flow paths that branch from the intake passage 3 to the plurality of engine cylinders 21 may be provided between the intake passage 3 and the engine 2. Furthermore, in FIGS. 1, an example is illustrated in which the exhaust passage 4 and the plurality of engine cylinders 21 are directly connected. However, when the exhaust passage 4 and the plurality of engine cylinders 21 are connected, an exhaust manifold having branched flow paths that branch from the exhaust passage 4 to the plurality of engine cylinders 21 may be provided between the exhaust passage 4 and the engine 2.

The intake passage 3 is connected to the plurality of engine cylinders 21 of the engine 2, and supplies compressed and cooled air to each of the engine cylinders 21. A mixed gas containing the air supplied from the intake passage 3 and fuel supplied from the fuel tank (not shown) is supplied from the intake passage 3 to the combustion chamber 21a of each engine cylinder 21. The intake passage 3 is provided with the turbocharger 5 on an intake direction upstream side, which compresses and feeds the mixed gas containing air and fuel that flows through the intake passage 3 toward an intake direction downstream side.

Note that the intake passage 3 is provided with a fuel supply device (not shown) that supplies fuel to the intake passage 3 on an upstream side or downstream side of the turbocharger 5. Furthermore, the intake passage 3 may be provided with an air filter (not shown) that purifies fresh air and introduces the air into the intake passage 3, and an intercooler (not shown) that cools the air flowing through the intake passage 3. The fuel supply device has a fuel supply amount (supply pressure), a supply timing, and the like, that are controlled by the control unit 13. The fuel supply device may be configured by a Venturi mixer that mixes the fuel with the air flowing on the upstream side or the downstream side of the turbocharger 5, or may be configured by an admission valve, an injector, or the like, that injects the fuel toward the intake passage 3 of each of the plurality of engine cylinders 21.

The exhaust passage 4 is a passage through which the exhaust substance that is discharged from the engine 2 flows, and is mainly connected to the plurality of engine cylinder 21 of the engine 2, and causes the exhaust gas generated in each of the engine cylinders 21 to flow and be discharged as an exhaust substance. Furthermore, the exhaust passage 4 has the blow-by path 6, which is connected to the crankcase 22, connected thereto, and causes the blow-by gas that flows via the blow-by path 6 to flow and be discharged as an exhaust substance.

The exhaust passage 4 is connected, on an exhaust direction downstream side, to a plurality of treatment devices having different functions for performing a treatment of the exhaust substance, such as the exhaust gas or the blow-by gas, that is flowing through the exhaust passage 4. In the present embodiment, an exhaust purification catalyst device 9 that purifies an exhaust gas by catalytic reduction using a reducing agent such as urea water, and an abatement device 10 are applied as the plurality of treatment devices. The exhaust passage 4 is branched further on the exhaust direction downstream side than a turbine 5a of the turbocharger 5, and includes a plurality of branch paths 6a and 6b that lead toward the plurality of treatment devices. The branch path 6a is provided with the exhaust purification catalyst device 9 as the treatment device. The branch path 6b is provided with the abatement device 10 as the treatment device.

The path switching valve 12 is provided at a branch point of the exhaust passage 4 that branches into the plurality of branch paths 6a and 6b. The path switching valve 12 is controlled by the control unit 12 and switches the path such that the exhaust gas that flows through the exhaust passage 4 flows through one of the plurality of branch paths 6a and 6b.

The turbocharger 5 compresses the air or mixed gas flowing through the intake passage 3, and feeds the gas toward an intake direction downstream side. The turbocharger 5 includes a turbine 5a and a compressor 5b. The turbine 5a is disposed in the exhaust passage 4, and the compressor 5b is disposed in the intake passage 3. The turbine 5a is rotated by the exhaust gas flowing through the exhaust passage 4. Further, as a result of driving the compressor 5b due to the rotational force of the turbine 5a, the air or mixed gas flowing through the intake passage 3 is compressed.

The blow-by path 6 is connected from the crankcase 22 up to the exhaust passage 4. The blow-by path 6 is connected to the exhaust passage 4 further on the exhaust direction upstream side in the exhaust passage 4 than the path switching valve 12. In FIG. 1, an example is illustrated in which the blow-by path 6 and the exhaust passage 4 are directly connected. However, a valve such as a check valve that prevents the exhaust gas from flowing into the blow-by path 6 may be provided between the blow-by path 6 and the exhaust passage 4. When the fuel gas leaks out from the combustion chamber 21a of each engine cylinder 21 into the crankcase 22, and causes the blow-by gas to be generated in the crankcase 22, the blow-by gas flows through the blow-by path 6. In addition, the blow-by path 6 is connected to the plurality of treatment devices having different functions for performing a treatment of the blow-by gas from the crankcase 22.

In the present embodiment, the exhaust purification catalyst device 9, the abatement device 10, and the intake return device 11 are applied as the plurality of treatment devices. However, in the engine device 1 according to the present invention, at least two treatment devices among the exhaust purification catalyst device 9, the abatement device 10, and the intake return device 11 may be applied.

The blow-by path 6 branches partway into a plurality of branch paths 6a, 6b and 6c which lead toward the exhaust purification catalyst device 9, the abatement device 10, and the intake return device 11. The branch point in the blow-by path 6 that branches into the plurality of branch paths 6a, 6b and 6c is provided with the path switching valve 12. The path switching valve 12 is controlled by the control unit 13 and switches the path such that the blow-by gas that flows through the blow-by path 6 flows through one of the plurality of branch paths 6a, 6b and 6c.

The filter 7 is provided on a flow direction upstream side of the blow-by gas in the blow-by path 6. The filter 7 separates oil mist contained in the blow-by gas flowing through the blow-by path 6 to produce a non-combusted mixed gas, and is configured by, for example, a mist separator.

The external drive pump 8 is provided in the blow-by path 6, and is further on a blow-by gas flow direction downstream side than the filter 7, and further on a blow-by gas flow direction upstream side than the path switching valve 12.

The external drive pump 8 is driven regardless of whether or not the engine 2 is running (operating), and causes the blow-by gas to flow through the blow-by path 6 that communicates with the crankcase 22, ventilates the inside of the crankcase 22, and creates a negative pressure inside the crankcase 22. As a result, leakage of the blow-by gas inside the crankcase 22 from the crankcase 22 at locations other than the blow-by path 6 is suppressed. For example, leakage from the crankcase 22 at the support location of the crankshaft 26 is suppressed. That is, the external drive pump 8 functions as a treatment device that treats the blow-by gas in the crankcase 22.

Note that the external drive pump 8 may be driven at the same intensity regardless of whether or not the engine 2 is running (operating), and cause the blow-by gas to flow at the same intensity. Alternatively, the external drive pump 8 may be driven with a relatively high intensity when the engine 2 is operating, and be driven with a relatively low intensity when the engine 2 is stopped. Alternatively, the external drive pump 8 may be driven until a predetermined time elapses after the engine 2 is stopped, and then be stopped after the predetermined time elapses.

The exhaust purification catalyst device 9 is disposed further toward on the exhaust direction downstream side than the path switching valve 12 in the branch path 6a of the exhaust passage 4. The exhaust purification catalyst device 9 purifies the exhaust substance, such as the exhaust gas or the blow-by gas, that is flowing through the branch path 6a by catalytic reduction using a reducing agent such as urea water. The branch path 6a discharges the exhaust substance that has been purified by the exhaust purification catalyst device 9. The exhaust purification catalyst device 9 operates in response to the running of the engine 2, and the catalyst is activated by being warmed up.

The exhaust purification catalyst device 9 is disposed in the exhaust passage 4 further on the exhaust direction downstream side than the turbine 5a of the turbocharger 5. The branch path 6a of the blow-by path 6, which leads toward the exhaust purification catalyst device 9, is connected to the exhaust passage 4 further on the exhaust direction downstream side than the turbine 5a of the turbocharger 5, and further toward the exhaust direction upstream side than the exhaust purification catalyst device 9. In FIG. 1, an example is illustrated in which the branch path 6a and the exhaust passage 4 are directly connected. However, a valve such as a check valve that prevents the exhaust gas from flowing into the branch path 6a may be provided between the branch path 6a and the exhaust passage 4. The exhaust purification catalyst device 9 operates in response to the running of the engine 2, and the catalyst is activated by being warmed up. When the exhaust purification catalyst device 9 purifies the exhaust gas that flows through the exhaust passage 4 by catalytic reduction, the exhaust purification catalyst device 9 serving as the treatment device also purifies the blow-by gas flowing via the branch path 6a of the blow-by path 6 by catalytic reduction.

Figures 2, 3:
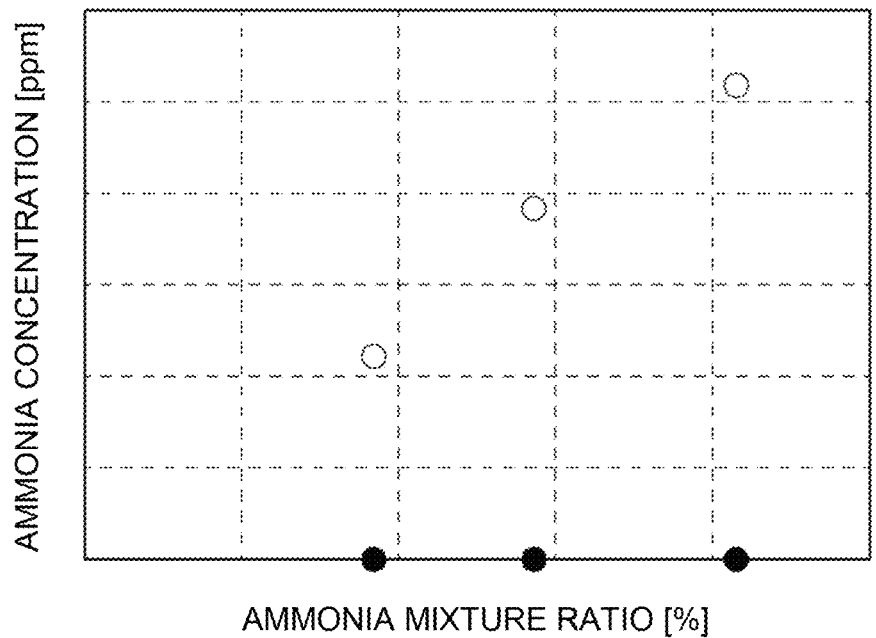
FIG. 2 is a graph illustrating the relationship between the ammonia concentration and mixture ratio contained in a blow-by gas that is input to, and output from, an exhaust purification catalyst device in the engine device according to the embodiment of the present invention.
FIG. 3 is a table illustrating examples of treatment devices in the engine device according to the embodiment of the present invention that are used depending on the engine state.

For example, FIG. 2 shows the relationship between the ammonia concentration and mixture ratio contained in the exhaust substance and the blow-by gas that is input to, and output from, the exhaust purification catalyst device 9. FIG. 2 plots the exhaust substance that is input to the exhaust purification catalyst device 9 with white circles, and plots the exhaust substance that is output from the exhaust purification catalyst device 9 with black circles. As shown in FIG. 2, regardless of the ammonia mixture ratio, the output ammonia concentration can be sufficiently suppressed by the exhaust purification catalyst device 9.

The abatement device 10 is disposed further on the exhaust direction downstream side than the path switching valve 12 in the branch path 6b of the exhaust passage 4 or in the branch path 6b of the blow-by path 6. The abatement device 10 is driven regardless of whether or not the engine 2 is running (operating), detoxifies a target substance (a toxic substances such as ammonia or methanol) contained the exhaust substance, such as the exhaust gas or the blow-by gas, that is flowing through the branch path 6b, and renders the exhaust substance harmless. The branch path 6b is not connected to either the intake passage 3 or the exhaust passage 4, and discharges the exhaust substance that has been rendered harmless by the abatement device 10. The abatement device 10 is configured by, for example, a gas decomposition-type abatement device, a scrubber-type abatement device, a combustion abatement-type abatement device, or a catalytic decomposition-type abatement device.

A gas decomposition-type abatement device is a device that uses a decomposition element to electrically or chemically decompose and detoxify a target substance (toxic substance) in the exhaust substance. A gas decomposition-type abatement device consumes a relatively small amount of power, and can be configured using relatively inexpensive equipment, but requires a neutralizing agent. A scrubber-type abatement device is a device that uses the solubility of a target substance (toxic substance) in water or a specific chemical solution to detoxify the target substances by spraying a washing solution such as water or sulfuric acid into the exhaust substance. A scrubber-type abatement device can be configured using relatively inexpensive equipment, but the equipment size becomes large.

Furthermore, a combustion abatement-type abatement device is a device that decomposes and detoxifies a target substance (toxic substance) by combusting and heating the exhaust substance to high temperatures using a burner or the like. A combustion abatement-type abatement device is suitable for detoxifying high concentrations of the target substance, but the power consumption is high, the fuel cost is high, and the equipment size becomes large. A catalytic decomposition-type abatement device is a device that uses a catalyst that promotes reduction and decomposition of a target substance (toxic substance) contained in the exhaust substance to detoxify the target substances at low temperature. A catalytic decomposition-type abatement device is capable of detoxifying the target substance at a relatively low temperature, but the equipment size becomes large, the equipment is expensive, and the running costs will increase. In the engine device 1, a suitable abatement device 10 is applied taking into consideration the advantages and disadvantages described above.

The intake return device 11 is a device that returns the blow-by gas to the intake passage 3 via the branch path 6c of the blow-by path 6. The branch path 6c is connected to the intake passage 3 further on the intake direction upstream side than the compressor 5b of the turbocharger 5. In FIG. 1, an example is illustrated in which the branch path 6c and the intake passage 3 are directly connected. However, a valve such as a check valve that prevents the intake gas from flowing into the branch path 6c may be provided between the branch path 6c and the intake passage 3. In other words, the intake return device 11 is configured by the branch path 6c, and a portion of the intake passage 3 from the branch path 6c to the turbocharger 5, and performs a treatment of the blow-by gas by mixing the blow-by gas that flows through the branch path 6c with the air or mixed gas that flows through the intake passage 3. The intake passage 3 and the turbocharger 5 operate in response to the running of the engine 2, and supply a mixed gas to the engine 2. Therefore, the intake return device 11 also operates in response to the running of the engine 2, and returns the blow-by gas to the intake passage 3.

The control unit 13 is a computer such as an engine control unit (ECU) that controls the operation of the engine 2, is provided with a CPU, a ROM, a RAM, and the like, and is configured to control each unit of the engine 2. The control unit 13 may store various programs for controlling the engine 2, and control the engine 2 by reading out and executing the programs.

In particular, the control unit 13 controls the path switching valve 12 depending on the state of the engine 2 and the plurality of treatment devices, and switches, among the plurality of treatment devices, to the treatment device that performs the treatment of the exhaust substance by switching to one of the plurality of branch paths 6a and 6b. FIG. 3 shows an example of the treatment device that is used depending on the state of the engine 2. In FIG. 3, the treatment device that is mainly used is indicated with a black circle, and the treatment device that is used as a backup if an abnormality occurs in the main treatment device is indicated with a white circle.

Specifically, the control unit 13 monitors whether the engine 2 is being operated or has been stopped. Further, during operation of the engine 2, the control unit 13 normally performs a control that causes the treatment of the exhaust substance to be performed by the exhaust purification catalyst device 9, that is, switches the path of the exhaust substance to the branch path 6a using the path switching valve 12.

On the other hand, even during operation of the engine 2, when an abnormality occurs in the treatment of the exhaust substance by the exhaust purification catalyst device 9, the control unit 13 performs a control that switches the treatment of the exhaust substance from the exhaust purification catalyst device 9 to the abatement device 10 or the intake return device 11, that is, switches the path of the exhaust substance to the branch path 6b or 6c using the path switching valve 12. In other words, the control unit 13 mainly uses the exhaust purification catalyst device 9 during operation of the engine 2, and uses the abatement device 10 as a backup depending on the state of the engine 2 and the plurality of treatment devices. At this time, if the control unit 13 is performing a control that prioritizes use of the abatement device 10 over the intake return device 11, and an abnormality occurs in the abatement device 10, it may perform a control that switches the treatment of the exhaust substance from the abatement device 10 to the intake return device 11.

For example, in order to determine whether or not an abnormality has occurred in the treatment of the exhaust substance by the exhaust purification catalyst device 9, the control unit 12 may monitor whether or not the exhaust purification catalyst device 9 is operating in conjunction with the operation of the engine 2, and determine that an abnormality has occurred in the treatment of the exhaust substance when the exhaust purification catalyst device 9 is not operating. Alternatively, the engine device 1 is provided with a sensor that detects a harmful substance such as ammonia or methanol that is contained in the exhaust gas from the exhaust purification catalyst device 9. Then, the control unit 13 may determine that an abnormality has occurred in the treatment of the exhaust substance when, based on the detection result of the sensor, a predetermined threshold or more of the harmful substance has been detected.

Furthermore, even during operation of the engine 2, when the treatment of the exhaust substance by the exhaust purification catalyst device 9 is not sufficient, the control unit 13 performs a control that switches the treatment of the exhaust substance from the exhaust purification catalyst device 9 to the abatement device 10 or the intake return device 11, that is, switches the path of the exhaust substance to the branch path 6b using the path switching valve 12. At this time, if the control unit 13 is performing a control that prioritizes use of the abatement device 10 over the intake return device 11, and an abnormality occurs in the abatement device 10, it may perform a control that switches the treatment of the exhaust substance from the abatement device 10 to the intake return device 11.

For example, in order to determine whether or not the treatment of the exhaust substance by the exhaust purification catalyst device 9 is sufficient, the engine device 1 may be provided with a torque sensor that detects the load (torque) on the engine 2, or a temperature sensor that detects the temperature of the exhaust gas flowing through the exhaust passage 4. Further, the control unit 13 may, based on the detection result of the torque sensor or the temperature sensor, determine that the treatment of the exhaust substance is not sufficient when a decrease in the temperature of the exhaust gas (for example, a decrease to a predetermined temperature threshold or lower) accompanying a decrease in the load on the engine 2 (for example, a decrease to a predetermined torque threshold or less) is detected.

Further, when the engine 2 is stopped, the control unit 13 performs a control that switches the treatment of the exhaust substance from the exhaust purification catalyst device 9 to the abatement device 10, that is, switches the path of the exhaust substance to the branch path 6b using the path switching valve 12. In other words, the control unit 13 mainly uses the exhaust purification catalyst device 9 after the engine 2 is stopped, and uses the abatement device 10 as a backup depending on the state of the engine 2 and the plurality of treatment devices.

Note that, when an emergency stop of the engine 2 occurs, the control unit 13 may mainly use the abatement device 10, and use the exhaust purification catalyst device 9 as a backup depending on the state of the engine 2 and the plurality of treatment devices.

As described above, according to the present embodiment, the engine device 1 runs on a fuel containing a toxic substance. The engine device 1 includes: the exhaust passage 4 that causes an exhaust substance that is discharged from the engine 2, such as an exhaust gas or a blow-by gas, to flow through; the plurality of treatment devices having different functions (the exhaust purification catalyst device 9, the abatement device 10, and the intake return device 11) that are disposed in the exhaust passage 4 as devices that perform a treatment of the exhaust substance; and the path switching valve 12 that is disposed in the exhaust passage 4, and switches, from among the plurality of treatment devices, to the treatment device that performs treatment of the exhaust substance. The abatement device 10, which is a treatment device, is a gas decomposition-type abatement device, a scrubber-type abatement device, a combustion abatement-type abatement device, or a catalytic decomposition-type abatement device. The toxic substance contained in the fuel is ammonia or methanol.

As a result, when an abnormality occurs in one of the treatment devices that perform the treatment of the exhaust substance, that is, when a single abnormality occurs, the engine device 1 is capable of performing the treatment of the exhaust substance by switching to another treatment device.

Therefore, the treatment of the exhaust substance containing the toxic substance does not depend on a single means, and even if a single abnormality occurs, it is possible to prevent leakage of the toxic substance contained in the exhaust substance to the outside, which contributes to improved safety. Note that, in the present embodiment, the intake passage 3 is not used for the treatment of the exhaust substance. Therefore, it is possible to suppress contamination of intake system components such as the intake passage 3 and the compressor 5b of the turbocharger 5 with the exhaust substance, which can lengthen the replacement interval of the intake system components. Furthermore, the intake system components can be configured without using members and coatings that are resistant to corrosion by the exhaust substance. Therefore, an increase in the cost of the intake system components can be suppressed, and a reduction in the product appeal of the intake system components can be suppressed.

In addition, according to the present embodiment, the engine device 1 includes the blow-by path 6, which is connected from the crankcase 22 up to the exhaust passage 4 further on the exhaust direction upstream side than the path switching valve 12, and the external drive pump 8, which causes the blow-by gas generated in the crankcase 22 to flow through the blow-by path 6.

As a result, even when the operation of the engine device 1 is stopped, the engine device 1 is capable of ventilating the inside of the crankcase 22 and creating a negative pressure inside the crankcase 22 using the external drive pump 8. Therefore, even when the engine 2 is stopped, the toxic substance in the blow-by gas remaining in the crankcase 22 is detoxified, and it is possible to suppress the contamination risk of the surrounding environment, which contributes to improved safety. Furthermore, because the blow-by path 6 is connected up to the exhaust passage 4, it is possible for the treatment of not only the exhaust gas from the engine 2, but also the blow-by gas from the crankcase 22 to be performed in the treatment device.

More specifically, according to the present embodiment, the engine device 1 includes the blow-by path 6 that is connected to the crankcase 22, the external drive pump 8 that causes the blow-by gas to flow through the blow-by path 6, and also includes, as the plurality of treatment devices, the exhaust purification catalyst device 9, the abatement device 10, and the intake return device 11.

As a result, the engine device 1 is capable of performing the treatment of the blow-by gas by selectively switching to one of the exhaust purification catalyst device 9, the abatement device 10, and the intake return device 11 as appropriate, depending on the state of the engine 2 and the treatment devices.

Furthermore, according to the present embodiment, the treatment of the exhaust substance is normally performed using the exhaust purification catalyst device 9 during operation of the engine. However, if an abnormality occurs in the treatment of the exhaust substance by the exhaust purification catalyst device 9, the engine device 1 switches the treatment of the exhaust substance from the exhaust purification catalyst device 9 to the abatement device 10 or the intake return device 11.

As a result, even if an abnormality occurs in the exhaust purification catalyst device 9, the engine device 1 is capable of performing the treatment of the exhaust substance without delay by using the abatement device 10 or the intake return device 11.

Alternatively, according to the present embodiment, the treatment of the exhaust substance is normally performed using the exhaust purification catalyst device 9 during operation of the engine, but if the treatment of the exhaust substance by the exhaust purification catalyst device 9 is not sufficient, the engine device 1 switches the treatment of the exhaust substance from the exhaust purification catalyst device 9 to the abatement device 10 or the intake return device 11.

As a result, even if the treatment of the exhaust substance by the exhaust purification catalyst device 9 is not sufficient due to a change or abnormality in the operation state of the engine occurring outside the exhaust purification catalyst device 9, such as a decrease in the load on the engine 2 or a decrease in the temperature of the exhaust gas, the engine device 1 is capable of performing the treatment of the exhaust substance without delay using the abatement device 10 or the intake return device 11.

Alternatively, according to the present embodiment, the engine device 1 performs the treatment of the exhaust substance using the exhaust purification catalyst device 9 during operation of the engine, but switches the treatment of the exhaust substance from the exhaust purification catalyst device 9 to the abatement device 10 when the engine 2 is stopped.

As a result, even if the treatment of the exhaust substance can no longer be performed using the exhaust purification catalyst device 9 due to the stopping of the engine 2, the engine device 1 can perform the treatment of the exhaust substance without delay by using the abatement device 10. Note that, by suppressing the treatment of the blow-by gas in the intake return device 11, it is possible to suppress contamination of intake system components such as the intake passage 3 and the compressor 5b of the turbocharger 5 with the blow-by gas, which can lengthen the replacement interval of the intake system components. Furthermore, the intake system components can be configured without using members and coatings that are resistant to corrosion by the blow-by gas. Therefore, an increase in the cost of the intake system components can be suppressed, and a reduction in the product appeal of the intake system components can be suppressed.

Note that, in the embodiment described above, an example has been described in which the engine device 1 includes the exhaust purification catalyst device 9, the abatement device 10, and the intake return device 11 as the plurality of treatment devices. However, the present invention is not limited to this example.

In a first modification, the engine device 1 does not include the intake return device 11, and includes the exhaust purification catalyst device 9 and the abatement device 10 as the plurality of treatment devices. In the first modification, like the embodiment described above, the control unit 13 controls the path switching valve 12 depending on the state of the engine 2 and the plurality of treatment devices, and switches the treatment device that performs the treatment of the blow-by gas to the exhaust purification catalyst device 9 or the abatement device 10 by switching to one of the plurality of branch paths 6a and 6b. As a result, the engine device 1 is capable of performing the treatment of the blow-by gas by selectively switching to the exhaust purification catalyst device 9 or the abatement device 10 as appropriate, depending on the state of the engine 2 and the treatment devices.

Note that, in the embodiment described above, an example in which the blow-by path 6 is connected to the exhaust passage 4 in order for the engine device 1 to perform the treatment of the blow-by gas as an exhaust substance by switching to the exhaust purification catalyst device 9 or the abatement device 10, and an example in which the engine device 1 includes the exhaust purification catalyst device 9, the abatement device 10, and the intake return device 11 as the plurality of treatment devices, have been described. However, the present invention is not limited to this example. For example, in the first modification, as shown in FIG. 4, the engine device 1 may be configured without including the blow-by path 6 connected to the exhaust passage 4, such that treatment of only the exhaust gas is performed as the exhaust substance by switching to the exhaust purification catalyst device 9 or the abatement device 10. Note that, in FIG. 4, an example is illustrated in which the engine device 1 does not include the blow-by path 6. However, in another example, the engine device 1 may include a blow-by path 6 that is connected to another treatment device instead of the exhaust passage 4. Further, in a second modification, the engine device 1 does not include the intake return device 11, and includes the exhaust purification catalyst device 9 and the abatement device 10 as the plurality of treatment devices. In the second modification, like the embodiment described above, the control unit 13 controls the path switching valve 12 depending on the state of the engine 2 and the plurality of treatment devices, and switches the treatment device that performs the treatment of the blow-by gas to the exhaust purification catalyst device 9 or the abatement device 10 by switching to one of the plurality of branch paths 6a and 6b. As a result, the engine device 1 is capable of performing the treatment of the blow-by gas by selectively switching to the exhaust purification catalyst device 9 or the abatement device 10 as appropriate, depending on the state of the engine 2 and the treatment devices.

Note that, because the blow-by gas is not treated by the intake return device 11, it is possible to suppress contamination of intake system components such as the intake passage 3 and the compressor 5b of the turbocharger 5 with the blow-by gas, which can lengthen the replacement interval of the intake system components. Furthermore, the intake system components can be configured without using members and coatings that are resistant to corrosion by the blow-by gas. Therefore, an increase in the cost of the intake system components can be suppressed, and a reduction in the product appeal of the intake system components can be suppressed.

Specifically, in the second modification, during operation of the engine 2, the control unit 13 normally performs a control such that the treatment of the blow-by gas is performed by the exhaust purification catalyst device 9.

On the other hand, even during operation of the engine 2, if an abnormality occurs in the treatment of the blow-by gas by the exhaust purification catalyst device 9, the control unit 13 performs a control that switches the treatment of the blow-by gas from the exhaust purification catalyst device 9 to the abatement device 10. In other words, the control unit 13 mainly uses the exhaust purification catalyst device 9 during operation of the engine 2, and uses the abatement device 10 as a backup depending on the state of the engine 2 and the plurality of treatment devices. As a result, even if an abnormality occurs in the exhaust purification catalyst device 9, the engine device 1 can perform the treatment of the blow-by gas without delay by using the abatement device 10.

Furthermore, even during operation of the engine 2, if the treatment of the blow-by gas by the exhaust purification catalyst device 9 is not sufficient, the control unit 13 performs a control that switches the treatment of the blow-by gas from the exhaust purification catalyst device 9 to the abatement device 10. As a result, even if the treatment of the blow-by gas by the exhaust purification catalyst device 9 is not sufficient due to a change or abnormality in the operation state of the engine 2 occurring outside the exhaust purification catalyst device 9, such as a decrease in the load on the engine 2 or a decrease in the temperature of the exhaust gas, the engine device 1 is capable of performing the treatment of the blow-by gas without delay using the abatement device 10.

In addition, in the second modification, when the engine 2 is stopped, the control unit 13 performs a control that switches the treatment of the blow-by gas from the exhaust purification catalyst device 9 to the abatement device 10. As a result, even if the treatment of the blow-by gas can no longer be performed using the exhaust purification catalyst device 9 due to the stopping of the engine 2, the engine device 1 can perform the treatment of the blow-by gas without delay by using the abatement device 10. Note that, in the second modification, when an emergency stop of the engine 2 occurs, the control unit 13 may mainly use the abatement device 10, and use the exhaust purification catalyst device 9 as a backup depending on the state of the engine 2 and the plurality of treatment devices.

Alternatively, in a third modification, the engine device 1 does not include the abatement device 10, and includes the exhaust purification catalyst device 9 and the intake return device 11 as the plurality of treatment devices. In the third modification, like the embodiment described above, the control unit 13 controls the path switching valve 12 depending on the state of the engine 2 and the plurality of treatment devices, and switches the treatment device that performs the treatment of the blow-by gas to the exhaust purification catalyst device 9 or the intake return device 11 by switching to one of the plurality of branch paths 6a and 6c. As a result, the engine device 1 is capable of performing the treatment of the blow-by gas by selectively switching to the exhaust purification catalyst device 9 or the intake return device 11 as appropriate, depending on the state of the engine 2 and the treatment devices.

Specifically, in the third modification, during operation of the engine 2, the control unit 13 normally performs a control such that the treatment of the blow-by gas is performed by the exhaust purification catalyst device 9.

On the other hand, even during operation of the engine 2, if an abnormality occurs in the treatment of the blow-by gas by the exhaust purification catalyst device 9, the control unit 13 performs a control that switches the treatment of the blow-by gas from the exhaust purification catalyst device 9 to the intake return device 11. In other words, the control unit 13 mainly uses the exhaust purification catalyst device 9 during operation of the engine 2, and uses the intake return device 11 as a backup depending on the state of the engine 2 and the plurality of treatment devices. As a result, even if an abnormality occurs in the exhaust purification catalyst device 9, the engine device 1 can perform the treatment of the blow-by gas without delay by using the intake return device 11.

Furthermore, even during operation of the engine 2, if the treatment of the blow-by gas by the exhaust purification catalyst device 9 is not sufficient, the control unit 13 performs a control that switches the treatment of the blow-by gas from the exhaust purification catalyst device 9 to the intake return device 11. As a result, even if the treatment of the blow-by gas by the exhaust purification catalyst device 9 is not sufficient due to a change or abnormality in the operation state of the engine 2 occurring outside the exhaust purification catalyst device 9, such as a decrease in the load on the engine 2 or a decrease in the temperature of the exhaust gas, the engine device 1 is capable of performing the treatment of the blow-by gas without delay using the intake return device 11.

In addition, in the third modification, the intake return device 11 does not operate when the engine 2 is stopped. Therefore, the control unit 13 may control the exhaust purification catalyst device 9 such that the treatment of the blow-by gas is maintained. Similarly, in the third modification, the intake return device 11 does not operate at the time of an emergency stop of the engine 2. Therefore, the control unit 13 may mainly use the exhaust purification catalyst device 9.

Note that the present invention can be appropriately modified within a range that does not contradict the gist or concepts of the invention that can be read throughout the claims and the specification, and an engine device to which such modifications have been made is also included in the technical concept of the present invention.

Supplementary Notes of the Invention

Hereinafter, a summary of the invention extracted from the embodiment described above will be additionally described. Note that individual configurations and processing functions described in the following supplementary notes may be selected, omitted, and combined as appropriate.

<Supplementary Note 1>

An engine device that runs on a fuel containing a toxic substance, comprising:
- an exhaust passage that causes an exhaust substance that is discharged from an engine to flow through;
- a plurality of treatment devices having different functions that are disposed in the exhaust passage as devices that perform a treatment of the exhaust substance; and
- a path switching valve that is disposed in the exhaust passage, and switches, from among the plurality of treatment devices, to the treatment device that performs the treatment of the exhaust substance.

<Supplementary Note 2>

The engine device according to supplementary note 1, comprising
- a blow-by path that is connected to the exhaust passage further on an exhaust direction upstream side than the path switching valve, and
- an external drive pump that causes a blow-by gas to flow through the blow-by path.

<Supplementary Note 3>

The engine device according to supplementary note 1, comprising
- as the plurality of treatment devices, an exhaust purification catalyst device and an abatement device.

<Supplementary Note 4>

The engine device according to supplementary note 3, wherein
- during engine operation, if an abnormality occurs in the treatment of the exhaust substance by the exhaust purification catalyst device, the treatment of the exhaust substance is switched from the exhaust purification catalyst device to the abatement device.

<Supplementary Note 5>

The engine device according to supplementary note 3, wherein
- during engine operation, if the treatment of the exhaust substance by the exhaust purification catalyst device is not sufficient, the treatment of the exhaust substance is switched from the exhaust purification catalyst device to the abatement device.

<Supplementary Note 6>

The engine device according to supplementary note 3, wherein
- during engine operation, the treatment of the exhaust substance is performed by the exhaust purification catalyst device, and when the engine is stopped, the treatment of the exhaust substance is switched from the exhaust purification catalyst device to the abatement device.

<Supplementary Note 7>

The engine device according to supplementary note 3, wherein
- the abatement device is a gas decomposition-type abatement device, a scrubber-type abatement device, a combustion abatement-type abatement device, or a catalytic decomposition-type abatement device.

<Supplementary Note 8>

The engine device according to supplementary note 1, wherein
- the toxic substance is ammonia or methanol.

<Supplementary Note 9>

The engine device according to supplementary note 1, comprising
- a plurality of treatment devices having different functions as devices that perform a treatment of a blow-by gas, and
- a path switching valve that switches, from among the plurality of treatment devices, the treatment device that performs the treatment of the blow-by gas.

<Supplementary Note 10>

The engine device according to supplementary note 9, comprising
- an external drive pump that causes the blow-by gas to flow through a blow-by path.

<Supplementary Note 11>

The engine device according to supplementary note 10, comprising
- as the plurality of treatment devices, an exhaust purification catalyst device and an abatement device.

<Supplementary Note 12>

The engine device according to supplementary note 11, wherein
- during engine operation, if an abnormality occurs in the treatment of the blow-by gas by the exhaust purification catalyst device, the treatment of the blow-by gas is switched from the exhaust purification catalyst device to the abatement device, or
- during engine operation, if the treatment of the blow-by gas by the exhaust purification catalyst device is not sufficient, the treatment of the blow-by gas is switched from the exhaust purification catalyst device to the abatement device, or
- during engine operation, the treatment of the blow-by gas is performed by the exhaust purification catalyst device, and when the engine is stopped, the treatment of the blow-by gas is switched from the exhaust purification catalyst device to the abatement device.

<Supplementary Note 13>

The engine device according to supplementary note 10, comprising
- as the plurality of treatment devices, an exhaust purification catalyst device and an intake return device.

\<Supplementary Note 14\>

The engine device according to supplementary note 13, wherein during engine operation, if an abnormality occurs in the treatment of the blow-by gas by the exhaust purification catalyst device, the treatment of the blow-by gas is switched from the exhaust purification catalyst device to the intake return device, or during engine operation, if the treatment of the blow-by gas by the exhaust purification catalyst device is not sufficient, the treatment of the blow-by gas is switched from the exhaust purification catalyst device to the intake return device.

\<Supplementary Note 15\>

The engine device according to supplementary note 10, comprising as the plurality of treatment devices, an exhaust purification catalyst device, an abatement device, and an intake return device.

\<Supplementary Note 16\>

The engine device according to supplementary note 15, wherein during engine operation, if an abnormality occurs in the treatment of the blow-by gas by the exhaust purification catalyst device, the treatment of the blow-by gas is switched from the exhaust purification catalyst device to the abatement device or the intake return device, or during engine operation, if the treatment of the blow-by gas by the exhaust purification catalyst device is not sufficient, the treatment of the blow-by gas is switched from the exhaust purification catalyst device to the abatement device or the intake return device.

\<Supplementary Note 17\>

The engine device according to supplementary note 15, wherein during engine operation, the treatment of the blow-by gas is performed by the exhaust purification catalyst device, and when the engine is stopped, the treatment of the blow-by gas is switched from the exhaust purification catalyst device to the abatement device.

\<Supplementary Note 18\>

The engine device according to supplementary note 11 or 15, wherein the abatement device is a gas decomposition-type abatement device, a scrubber-type abatement device, a combustion abatement-type abatement device, or a catalytic decomposition-type abatement device.

\<Supplementary Note 19\>

The engine device according to supplementary note 9, wherein the toxic substance is ammonia or methanol.

REFERENCE SIGNS LIST

1 Engine device
2 Engine
3 Intake passage
4 Exhaust passage
5 Turbocharger
5a Turbine
5b Compressor
6 Blow-by path
6a, 6b, 6c Branch path
7 Filter
8 External drive pump
9 Exhaust purification catalyst device
10 Abatement device
11 Intake return device
12 Path switching valve
13 Control unit
20 Cylinder block
21 Engine cylinder
21a Combustion chamber
22 Crankcase
23 Cylinder
24 Piston
25 Cylinder head
26 Crankshaft
27 Connecting rod

The invention claimed is:

1. An engine device that operates with a fuel containing a toxic substance, comprising:
   an exhaust passage that causes an exhaust substance that is discharged from an engine to flow through;
   a blow-by path through which a blow-by gas discharged from a crankcase of the engine flows;
   a plurality of first treatment devices having different functions and that are disposed in the exhaust passage as devices that perform a treatment of the exhaust substance; and
   a path switching valve that is disposed in the exhaust passage and the blow-by path, and switches, from among the plurality of first treatment devices, to the first treatment device that performs the treatment of the exhaust substance.

2. The engine device according to claim 1, wherein the blow-by path is connected to the exhaust passage further on an exhaust direction upstream side than the path switching valve, and
   the engine device further comprises an external drive pump that causes the blow-by gas to flow through the blow-by path.

3. The engine device according to claim 1, comprising as the plurality of first treatment devices, an exhaust purification catalyst device and an abatement device.

4. The engine device according to claim 3, wherein during engine operation, if an abnormality occurs in the treatment of the exhaust substance by the exhaust purification catalyst device, the treatment of the exhaust substance is switched from the exhaust purification catalyst device to the abatement device.

5. The engine device according to claim 3, wherein during engine operation, if the treatment of the exhaust substance by the exhaust purification catalyst device is not sufficient, the treatment of the exhaust substance is switched from the exhaust purification catalyst device to the abatement device.

6. The engine device according to claim 3, wherein during engine operation, the treatment of the exhaust substance is performed by the exhaust purification catalyst device, and when the engine is stopped, the treatment of the exhaust substance is switched from the exhaust purification catalyst device to the abatement device.

7. The engine device according to claim 3, wherein the abatement device is a gas decomposition-type abatement device, a scrubber-type abatement device, a combustion abatement-type abatement device, or a catalytic decomposition-type abatement device.

8. The engine device according to claim 1, wherein the toxic substance is ammonia or methanol.

9. The engine device according to claim 1, comprising:
   a plurality of second treatment devices having different functions as devices that perform a treatment of the blow-by gas, wherein the plurality of second treatment devices include at least one of the plurality of first treatment devices, and wherein the path switching valve switches, from among the plurality of first treatment devices, to the first treatment device that performs the treatment of the exhaust substance or, from among the plurality of second treatment devices, to the second treatment device that performs the treatment of the blow-by gas.

10. The engine device according to claim 9, comprising an external drive pump that causes the blow-by gas to flow through the blow-by path.

11. The engine device according to claim 10, comprising as the plurality of second treatment devices, an exhaust purification catalyst device and an abatement device.

12. The engine device according to claim 11, wherein during engine operation, if an abnormality occurs in the treatment of the blow-by gas by the exhaust purification catalyst device, the treatment of the blow-by gas is switched from the exhaust purification catalyst device to the abatement device, or during engine operation, if the treatment of the blow-by gas by the exhaust purification catalyst device is not sufficient, the treatment of the blow-by gas is switched from the exhaust purification catalyst device to the abatement device, or during engine operation, the treatment of the blow-by gas is performed by the exhaust purification catalyst device, and when the engine is stopped, the treatment of the blow-by gas is switched from the exhaust purification catalyst device to the abatement device.

13. The engine device according to claim 11, wherein the abatement device is a gas decomposition-type abatement device, a scrubber-type abatement device, a combustion abatement-type abatement device, or a catalytic decomposition-type abatement device.

14. The engine device according to claim 10, comprising as the plurality of second treatment devices, an exhaust purification catalyst device and an intake return device.

15. The engine device according to claim 14, wherein during engine operation, if an abnormality occurs in the treatment of the blow-by gas by the exhaust purification catalyst device, the treatment of the blow-by gas is switched from the exhaust purification catalyst device to the intake return device, or during engine operation, if the treatment of the blow-by gas by the exhaust purification catalyst device is not sufficient, the treatment of the blow-by gas is switched from the exhaust purification catalyst device to the intake return device.

16. The engine device according to claim 10, comprising as the plurality of second treatment devices, an exhaust purification catalyst device, an abatement device, and an intake return device.

17. The engine device according to claim 16, wherein during engine operation, if an abnormality occurs in the treatment of the blow-by gas by the exhaust purification catalyst device, the treatment of the blow-by gas is switched from the exhaust purification catalyst device to the abatement device or the intake return device, or during engine operation, if the treatment of the blow-by gas by the exhaust purification catalyst device is not sufficient, the treatment of the blow-by gas is switched from the exhaust purification catalyst device to the abatement device or the intake return device.

18. The engine device according to claim 16, wherein during engine operation, the treatment of the blow-by gas is performed by the exhaust purification catalyst device, and when the engine is stopped, the treatment of the blow-by gas is switched from the exhaust purification catalyst device to the abatement device.

19. The engine device according to claim 1, wherein the toxic substance is ammonia or methanol.

* * * * *